United States Patent
Hwang et al.

(10) Patent No.: US 11,483,601 B2
(45) Date of Patent: *Oct. 25, 2022

(54) TECHNIQUE FOR TRANSMITTING AND RECEIVING SYSTEM TIME INFORMATION IN BROADCASTING SYSTEM

(71) Applicant: Samsung Electronics Co., Ltd., Suwon-si (KR)

(72) Inventors: Sung-Oh Hwang, Yongin-si (KR); Hyun-Koo Yang, Seoul (KR); Kyung-Mo Park, Seoul (KR); Young-Kwon Lim, Goyang-si (KR); Ji-Eun Keum, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/194,809

(22) Filed: Mar. 8, 2021

(65) Prior Publication Data

US 2021/0195257 A1    Jun. 24, 2021

Related U.S. Application Data

(63) Continuation of application No. 16/727,691, filed on Dec. 26, 2019, now Pat. No. 10,945,007, which is a (Continued)

(30) Foreign Application Priority Data

Jun. 24, 2014   (KR) .................. 10-2014-0077730

(51) Int. Cl.
*H04N 21/2381* (2011.01)
*H04N 21/242* (2011.01)
(Continued)

(52) U.S. Cl.
CPC ........ *H04N 21/2381* (2013.01); *H04H 20/18* (2013.01); *H04H 60/40* (2013.01);
(Continued)

(58) Field of Classification Search
CPC ............. H04N 21/234; H04N 21/2343; H04N 21/242; H04N 21/23605; H04N 21/2368;
(Continued)

(56) References Cited

U.S. PATENT DOCUMENTS 7,349,359 B2 * 3/2008 Chang .................... H04L 12/66
                                                      370/312
7,545,794 B2    6/2009 Loukianov
(Continued)

FOREIGN PATENT DOCUMENTS

JP    2008-252832 A    10/2008
KR    10-2009-0063797 A    6/2009
(Continued)

OTHER PUBLICATIONS

Korean Office Action dated Sep. 26, 2021, issued in a Korean Application No. 10-2017-7001989.

*Primary Examiner* — Chi H Pham
*Assistant Examiner* — Vladislav Y Agureyev
(74) *Attorney, Agent, or Firm* — Jefferson IP Law, LLP

(57) ABSTRACT

The present disclosure provides a data transmission method of a system in an IP based broadcasting network, the data transmission method comprising the steps of: generating an MPEG media transport protocol (MMTP) packet using a media processing unit (MPU) for a service; generating an IP packet using the MMTP packet; generating a layer 2 (L2) packet using the IP packet and generating a layer 1 (L1) packet stream using the L2 packet; and transmitting the L1 packet stream, wherein absolute time information of the (Continued)

system is included in one of a transmission frame of the L1 packet stream and the L2 packet.

6 Claims, 10 Drawing Sheets

Related U.S. Application Data continuation of application No. 15/320,638, filed as application No. PCT/KR2015/006383 on Jun. 23, 2015, now Pat. No. 10,547,884.

(51) Int. Cl.
| | |
|---|---|
| *H04N 21/234* | (2011.01) |
| *H04H 60/82* | (2008.01) |
| *H04H 60/40* | (2008.01) |
| *H04H 20/18* | (2008.01) |
| *H04L 65/70* | (2022.01) |
| *H04L 65/611* | (2022.01) |
| *H04L 65/1101* | (2022.01) |
| *H04L 41/0246* | (2022.01) |
| *H04N 21/2368* | (2011.01) |
| *H04N 21/434* | (2011.01) |
| *H04N 21/643* | (2011.01) |

(52) U.S. Cl.
CPC ......... *H04H 60/82* (2013.01); *H04L 41/0246* (2013.01); *H04L 65/1101* (2022.05); *H04L 65/611* (2022.05); *H04L 65/70* (2022.05); *H04N 21/234* (2013.01); *H04N 21/2368* (2013.01); *H04N 21/242* (2013.01); *H04N 21/4347* (2013.01); *H04N 21/64322* (2013.01)

(58) Field of Classification Search
CPC ......... H04N 21/2381; H04N 21/44347; H04N 21/64322; H04H 20/18; H04H 60/40; H04H 60/82; H04L 29/06027; H04L 41/0246; H04L 65/4076; H04L 65/607
See application file for complete search history.

(56) References Cited

U.S. PATENT DOCUMENTS

| | | | |
|---|---|---|---|
| 7,664,031 B2* | 2/2010 | Davis | H04L 41/26 |
| | | | 709/224 |
| 8,085,802 B1 | 12/2011 | Monk et al. | |
| 8,498,294 B1 | 7/2013 | Monk et al. | |
| 2007/0242678 A1* | 10/2007 | Fu | H04N 21/43072 |
| | | | 375/E7.278 |
| 2008/0075019 A1 | 3/2008 | Petras | |
| 2008/0259905 A1* | 10/2008 | Connors | H04W 36/02 |
| | | | 370/350 |
| 2009/0041114 A1 | 2/2009 | Clark | |
| 2009/0190518 A1 | 7/2009 | Kim et al. | |
| 2010/0158015 A1 | 6/2010 | Wu | |
| 2010/0315986 A1 | 12/2010 | Lee et al. | |
| 2011/0200130 A1 | 8/2011 | Choi et al. | |
| 2012/0243600 A1 | 9/2012 | Jeong et al. | |
| 2012/0288280 A1 | 11/2012 | Sui | |
| 2013/0155905 A1* | 6/2013 | Sampath | H04L 67/16 |
| | | | 370/255 |
| 2013/0219431 A1 | 8/2013 | Hong et al. | |
| 2014/0109159 A1 | 4/2014 | Rhyu et al. | |
| 2014/0204828 A1* | 7/2014 | Connors | H04W 48/10 |
| | | | 370/312 |
| 2015/0006633 A1 | 1/2015 | Vandwalle et al. | |
| 2015/0113577 A1 | 4/2015 | Yie et al. | |
| 2015/0124594 A1 | 5/2015 | Ryu et al. | |
| 2015/0181003 A1 | 6/2015 | Kim et al. | |
| 2015/0373380 A1* | 12/2015 | Tsukagoshi | H04N 21/8456 |
| | | | 725/109 |
| 2015/0381676 A1 | 12/2015 | Seok | |
| 2016/0337672 A1 | 11/2016 | Lee et al. | |
| 2016/0359603 A1 | 12/2016 | Fay | |
| 2018/0077471 A1 | 3/2018 | Takahashi et al. | |
| 2018/0262653 A1* | 9/2018 | Stewart | H04N 5/04 |
| 2020/0137432 A1 | 4/2020 | Hwang et al. | |

FOREIGN PATENT DOCUMENTS

| | | |
|---|---|---|
| KR | 10-2013-0126538 A | 11/2013 |
| KR | 10-2014-0008237 A | 1/2014 |
| KR | 10-2014-0047008 A | 4/2014 |
| WO | 2014/084643 A1 | 6/2014 |

* cited by examiner

TECHNIQUE FOR TRANSMITTING AND RECEIVING SYSTEM TIME INFORMATION IN BROADCASTING SYSTEM

CROSS-REFERENCE TO RELATED APPLICATION(S)

This application is a continuation application of prior application Ser. No. 16/727,691, filed on Dec. 26, 2019, which will be issued as U.S. Pat. No. 10,945,007 on Mar. 9, 2021; which is a continuation application of prior application Ser. No. 15/320,638, filed on Dec. 20, 2016, which issued as U.S. Pat. No. 10,547,884 on Jan. 28, 2020, which is a National Phase Entry of PCT International Application No. PCT/KR2015/006383, which was filed on Jun. 23, 2015, and claimed a priority to Korean Patent Application No. 10-2014-0077730, which was filed on Jun. 24, 2014, the contents of which are incorporated herein by reference.

TECHNICAL FIELD

The present disclosure relates to a method of transmitting and receiving system time information in a broadcasting system, and more particularly, to a method and apparatus for transmitting and receiving data including the system time information.

BACKGROUND ART

Recently, an Internet protocol (IP)-based broadcasting communication system that combines communication through a broadband network and communication through a radio frequency (RF), has been designed and established.

As an IP broadcasting network has been introduced, a system clock that was conventionally utilized for moving pictures expert group (MPEG) 2 transport stream (TS) is no longer available. Since the system clock is unavailable, time information to be used for synchronization between a client and a server system is required. However, a detailed method of providing a reference time to be used for the synchronization has not yet been proposed.

There is a desire for a synchronization reference time to synchronize a reproduction point in time between two or more contents transmitted through the heterogeneous networks in a broadcasting communication system that combines heterogeneous networks, such as a broadband network and an RF network.

DETAILED DESCRIPTION OF THE INVENTION

Technical Problem

The present disclosure provides a scheme of providing time information to be used for the synchronization between a client and a system in an IP-based broadcasting network.

Also, the present disclosure provides a scheme of providing time information to be used for synchronizing the reproduction of contents transmitted through a heterogeneous network.

Also, the present disclosure provides a method of providing the time information through an L1 layer.

Also, the present disclosure provides a method of providing the time information through an L2 layer.

Technical Solution

In accordance with an aspect of the present disclosure, there is provided a data transmission method of a system in an IP-based broadcasting network, the method including: generating an MPEG media transport protocol (MMTP) packet using a media processing unit (MPU) associated with a service; generating an IP packet using the MMTP packet; generating a layer 2 (L2) packet using the IP packet, and generating a layer 1 (L1) packet stream using the L2 packet; and transmitting the L1 packet stream, wherein absolute time information of the system is included in one of a transmission frame of the L1 packet stream and the L2 packet.

In accordance with another aspect of the present disclosure, there is provided a method of receiving data from a system of a client in an IP-based broadcasting network, the method including: receiving a signal associated with a service; interpreting a layer 1 (L1) signal of the received signal, and restoring an L1 packet stream; obtaining a layer 2 (L2) packet by processing the L1 packet stream; obtaining time information transmitted through one of a transmission frame of the restored L1 packet stream and the L2 packet, and setting the time information as a current time; de-packetizing the L2 packet and obtaining an IP packet; and de-packetizing the IP packet, and obtaining one or more pieces of content data associated with the service, wherein the time information is absolute time information of the system.

In accordance with another aspect of the present disclosure, there is provided a system device for transmitting data in an IP-based broadcasting network, the device including: a controller configured to: generate an MPEG media transport protocol (MMTP) packet using a media processing unit (MPU) associated with a service; generate an IP packet using the MMTP packet; generate a layer 2 (L2) packet using the IP packet; and generate a layer 1 (L1) packet stream using the L2 packet; and a transceiving unit configured to transmit the L1 packet stream, wherein absolute time information of the system is included in one of a transmission frame of the L1 packet stream and the L2 packet.

In accordance with another aspect of the present disclosure, there is provided a client device for receiving data from a system in an IP-based broadcasting network, the device including: a transceiving unit configured to receive a signal associated with a service; and a controller. The controller is configured to: restore a layer 1 (L1) packet stream by interpreting an L1 signal of the received signal; obtain a layer 2 (L2) packet by processing the L1 packet stream; obtain time information transmitted through one of a transmission frame of the restored L1 packet stream and the L2 packet, so as to set the time information as a current time; obtain an IP packet by de-packetizing the L2 packet; and obtain one or more pieces of content data associated with the service by de-packetizing the IP packet, wherein the time information is absolute time information of the system.

Advantageous Effects

A client may play back a media content at a planed point in time, irrespective of the type of network that transmits the media content. Consequentially, all clients can play back the media content at a point in time that is synchronized with a system time.

The client use absolute time information that is transmitted through an L1 signaling or an L2 signaling, and thus, may be synchronized with the absolute time of the system without an error associated with a transmission delay.

MODE FOR CARRYING OUT THE INVENTION

Hereinafter, embodiments of the present disclosure will be described in detail with reference to the accompanying drawings. In the following description of the present disclosure, a detailed description of known configurations or functions incorporated herein will be omitted when it is determined that the detailed description may make the subject matter of the present disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification.

In the detailed description of the present disclosure, an example of interpretable meanings of some terms used in the present disclosure is proposed. However, it is noted that the terms are not limited to the examples of the construable meanings which are proposed below.

In the present disclosure, a system is an entity that communicates with a client and provides a content, and is also referred to as a server, a server system, a providing system, a broadcasting device, a broadcasting tower, a transmitting device, and the like.

In the present disclosure, a client is an entity that communicates with a system, and is also referred to as a reception device, a television (TV), a device, a user equipment (UE), a mobile station (MS), a mobile equipment (ME), a terminal, and the like.

In the present disclosure, absolute time (or a system time) is a reference time used when a client determines a point in time when to reproduce a content, for example, the current time of a system. The absolute time may be distinguished from a content reproduction time, which may be included in an MPEG media transport-composition information (MMT-CI), and the like. The content reproduction time is information indicating a point in time when the client needs to reproduce the content. The client needs to have its own clock (that is, client's own clock) to determine whether the content reproduction time arrives, and the client may synchronize its clock with the current time of the system using the absolute time. Unless otherwise described, "time" in "time information" used in the present disclosure should be construed as the absolute time.

Figure 1:
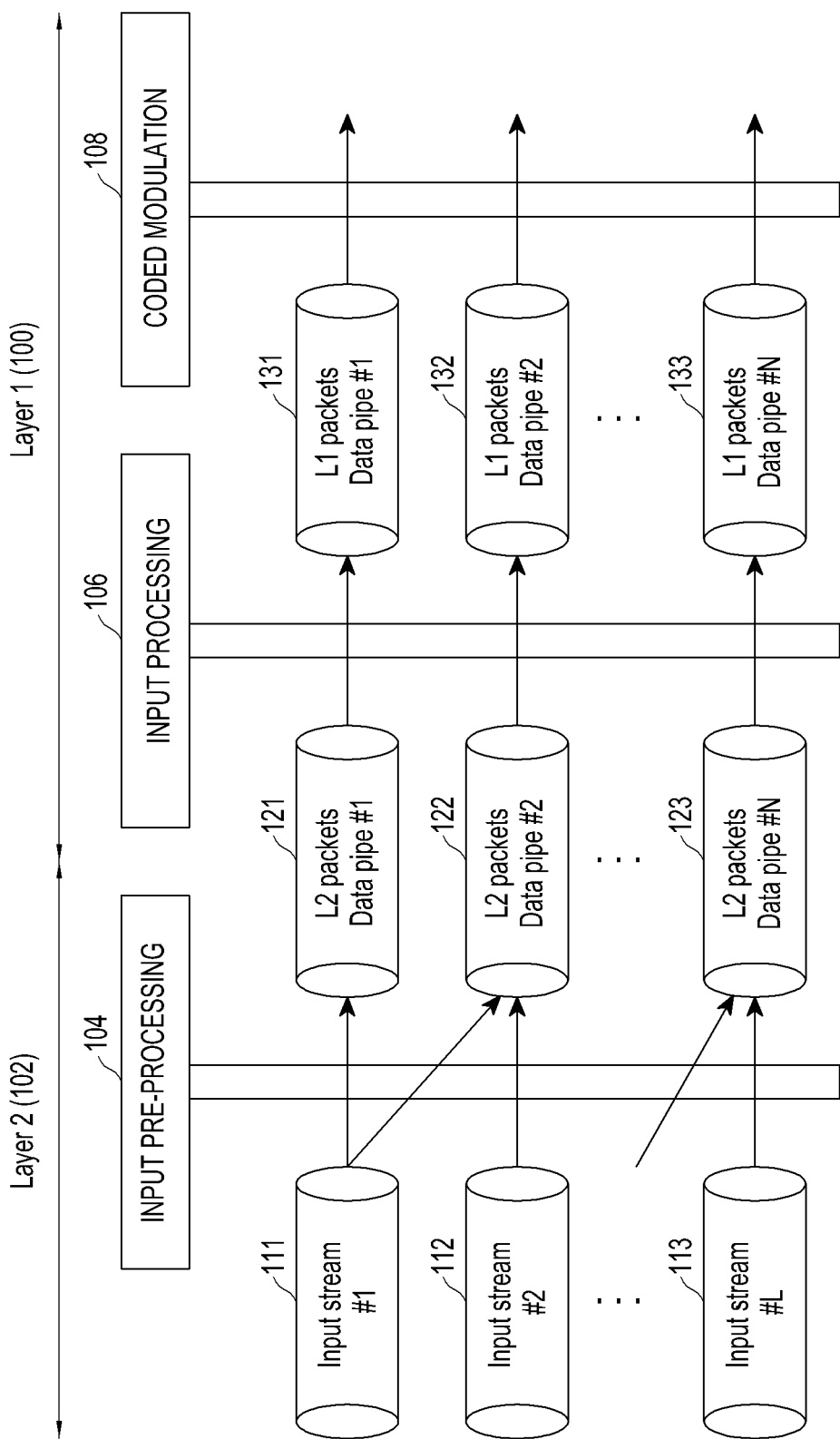
FIG. 1 is a diagram illustrating a process in which an input stream of a content to be transmitted is processed in a layer 2 and a layer 1 of a server system.

FIG. 1 is a diagram illustrating a process in which an input stream of a content to be transmitted is processed in a layer 2 and a layer 1 of a server system.

For example, a layer 1 100 illustrated in FIG. 1 may be a physical (PHY) layer of an advanced television system committee (ATSC) 3.0 system, and a layer 2 may be a layer 2 (L2) 102 of an ATSC system. The layer 2 102 may be a layer that interfaces the layer 1 100 and a layer higher than an IP layer (that is, a higher layer), and is also referred to as a "link layer".

As illustrated in FIG. 1, a process of processing an input stream 111, 112, and 113 into a layer-1 (L1) packet 131, 132, and 133 may be performed in a data pipe level. The data pipe associated with the L1 packet may be, for example, a physical layer pipe (PLP) of a digital video broadcasting-terrestrial version 2 (DVB-T2).

One or more input streams 111, 112, and 113 may be processed into data pipes 121, 122, and 123 associated with one or more layer-2 (L2) packets through an input pre-processing process 104.

The data pipes 121, 122, and 123 associated with one or more L2 packets may be encapsulated into data pipes 131, 132, and 133 associated with one or more L1 packets through an input processing process 106. Optionally, each of the data pipes 121, 122, and 123 associated with the L2 packets generated in the input pre-processing process 104 may further include a separate L2 packet for transmitting signaling information, in addition to the input streams 111, 112, and 113 including a content to be transmitted. For example, the separate L2 packet may be used for transmitting time information described in the present disclosure.

The data pipes 131, 132, and 133 associated with one or more L1 packets may be scheduled (or generated) as a transmission frame during a coded modulation process 108.

Figure 2:
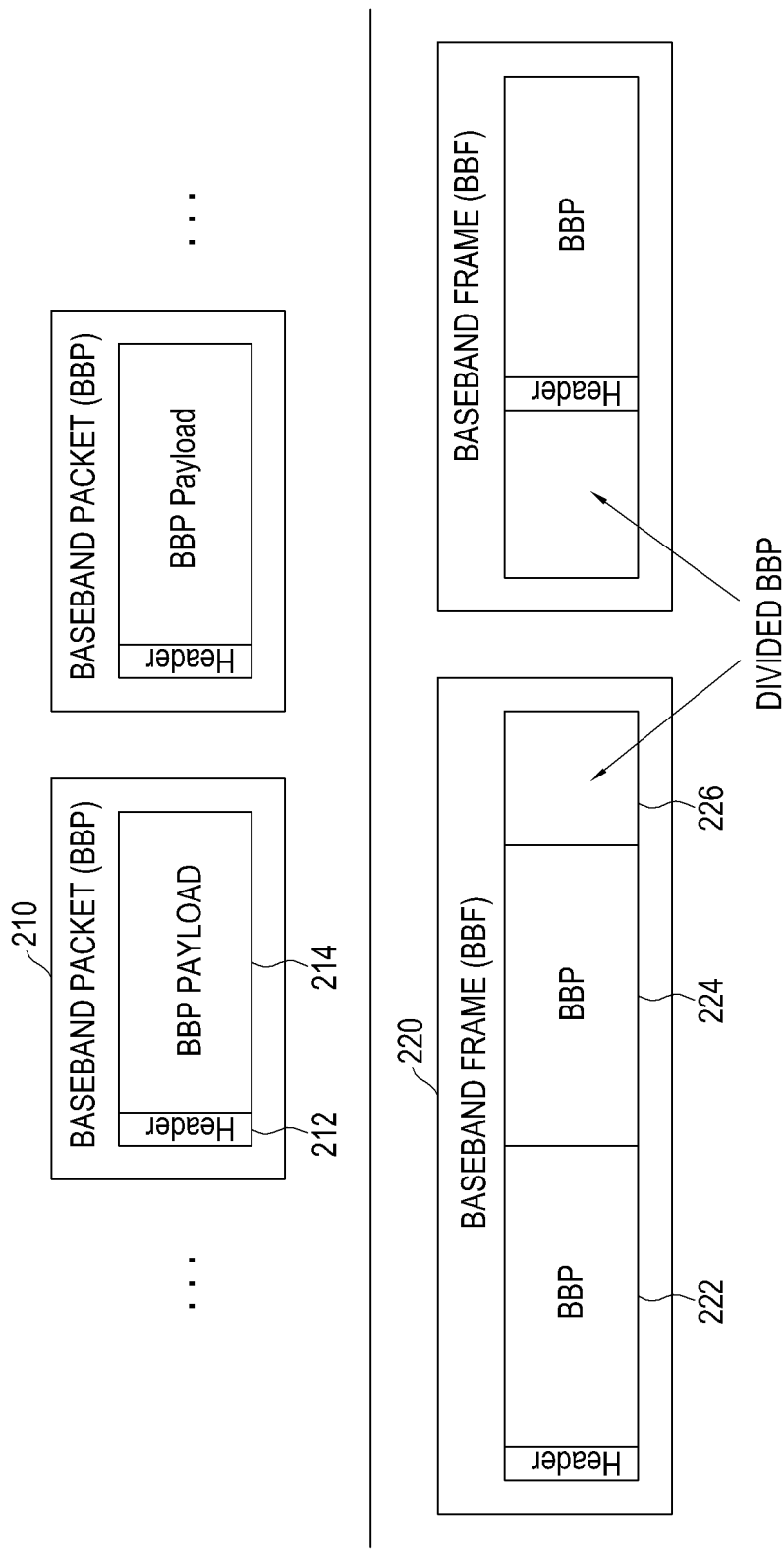
FIG. 2 is a diagram illustrating a relationship between an L2 packet and an L1 packet.

FIG. 2 is a diagram illustrating a relationship between an L2 packet and an L1 packet.

Referring to FIG. 2, for example, an L2 packet corresponds to a baseband packet (BBP) 210, and the L1 packet corresponds to a baseband frame (BBF) 220.

The BBP 210 may include a header 212 and a BBP payload 214. The BBP payload 214 of the BBP 210 may be a part or the entirety of packets included in an input stream, or may be a data structure indicating signaling information.

The BBF 220 may include one or more BBPs 222 and 224, or a part of the BBP (e.g., a BBP segment) 226.

Alternatively, unlike FIG. 2, the L2 packet may correspond to an ATSC 3.0 link layer protocol (ALP) packet, and the L1 packet may correspond to a baseband packet.

Hereinafter, a method of sending the absolute time of a system to a client will be described in detail. Particularly, a first embodiment that transmits time information through an L1 signaling and a second embodiment that transmits time information through an L2 signaling will be described.

First, the first embodiment of the present disclosure that transmits time information through an L1 signaling will be described.

Figure 3:
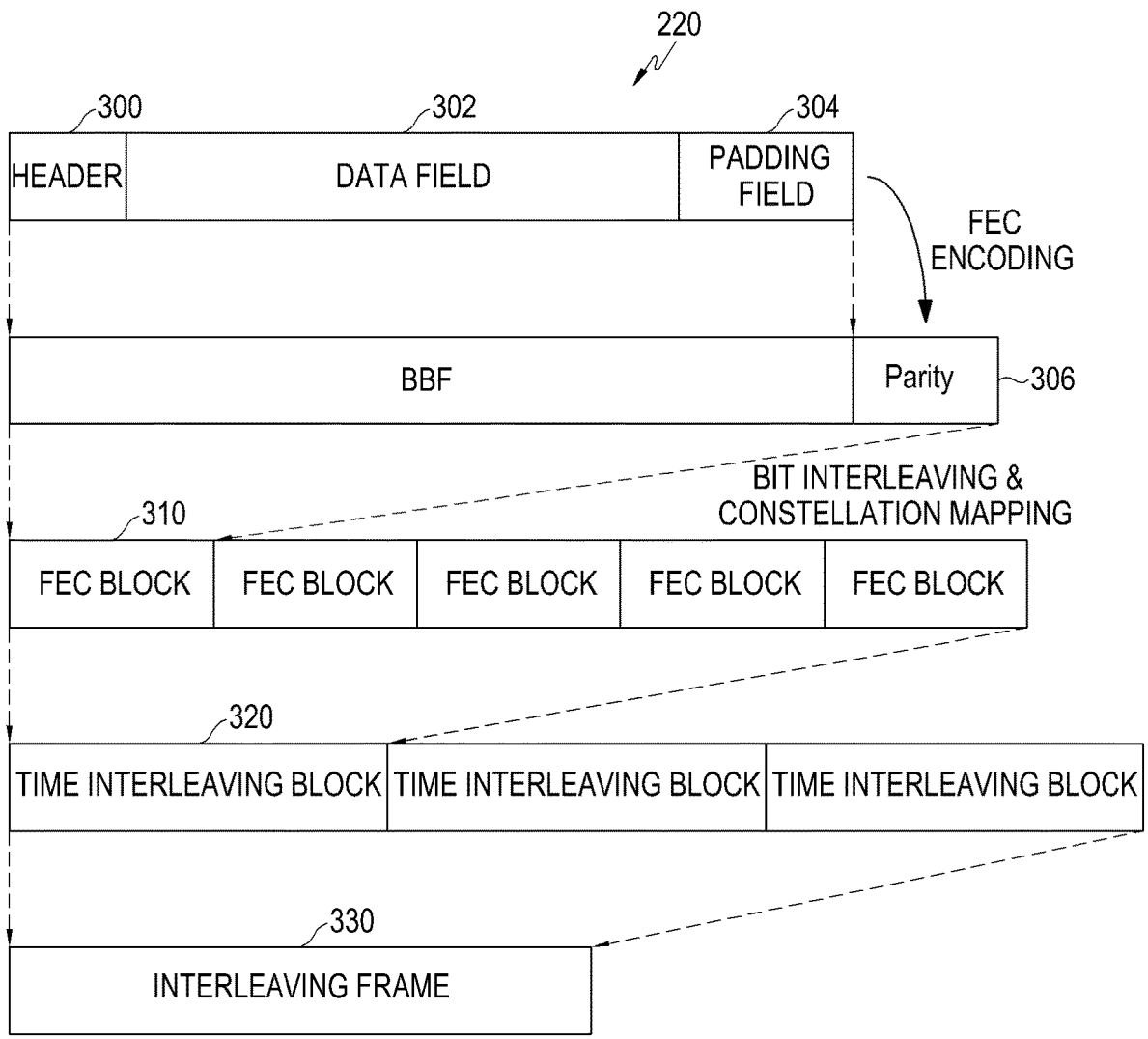
FIG. 3 is a diagram illustrating a frame structure associated with an L1 data pipe according to a first embodiment of the present disclosure.

FIG. 3 is a diagram illustrating a frame structure associated with an L1 data pipe according to the first embodiment of the present disclosure.

Referring to FIG. 3, the BBF 220 may include a header 300, a data field 302, and a padding field 304.

A parity 306 may be added to the BBF 220 through a forward error correction (FEC) encoding process.

The BBF to which the parity is added may be processed into an FEC block 310 through a bit interleaving and constellation mapping process.

One or more FEC blocks 310 may be processed into a time interleaving block 320 through a cell interleaving process.

One or more time interleaving blocks 320 may form an interleaving frame 330.

Figure 4A:
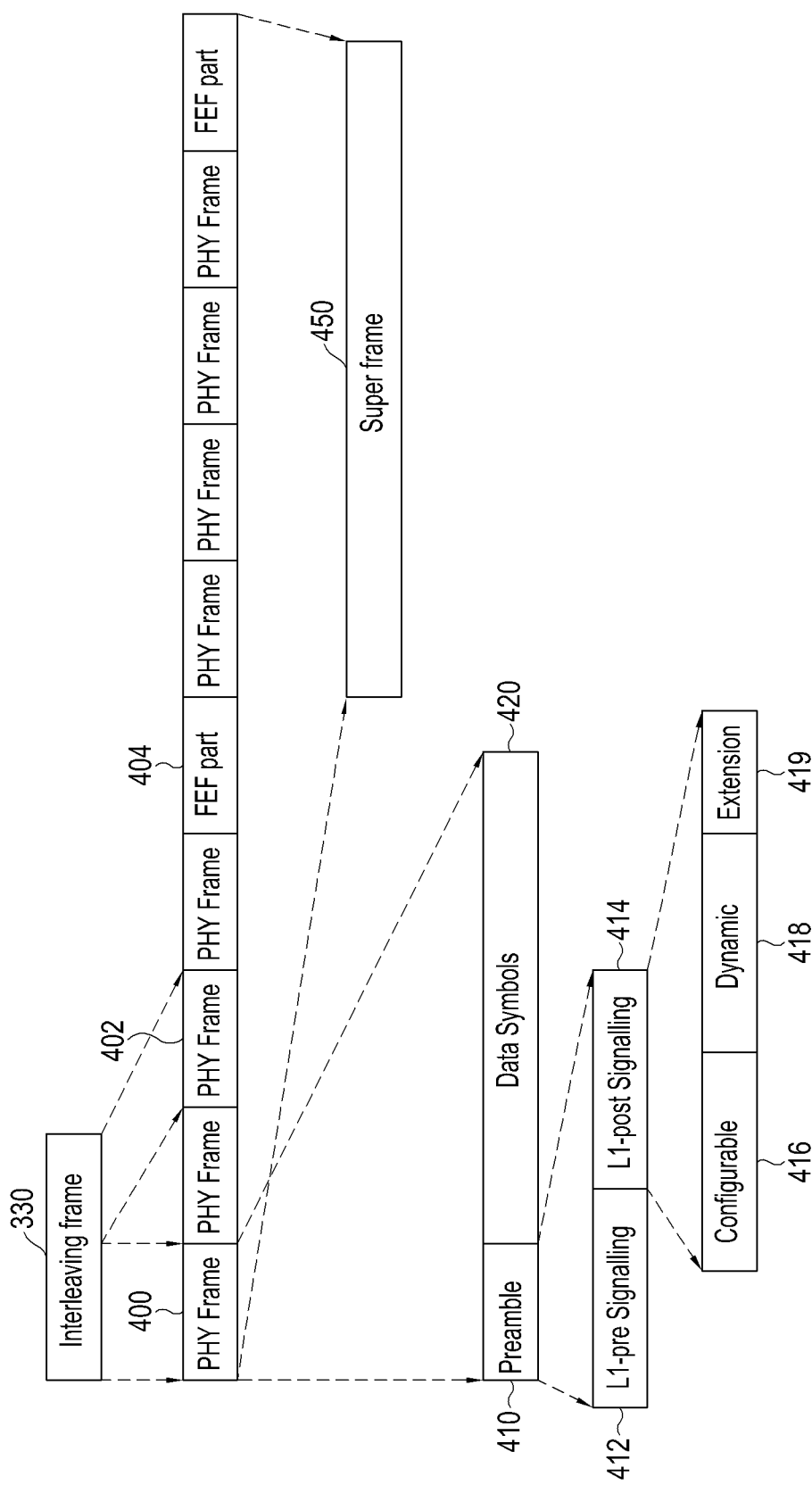
FIGS. 4A and 4B are diagrams illustrating a structure of an L1 frame according to the first embodiment of the present disclosure.
Figure 4B:
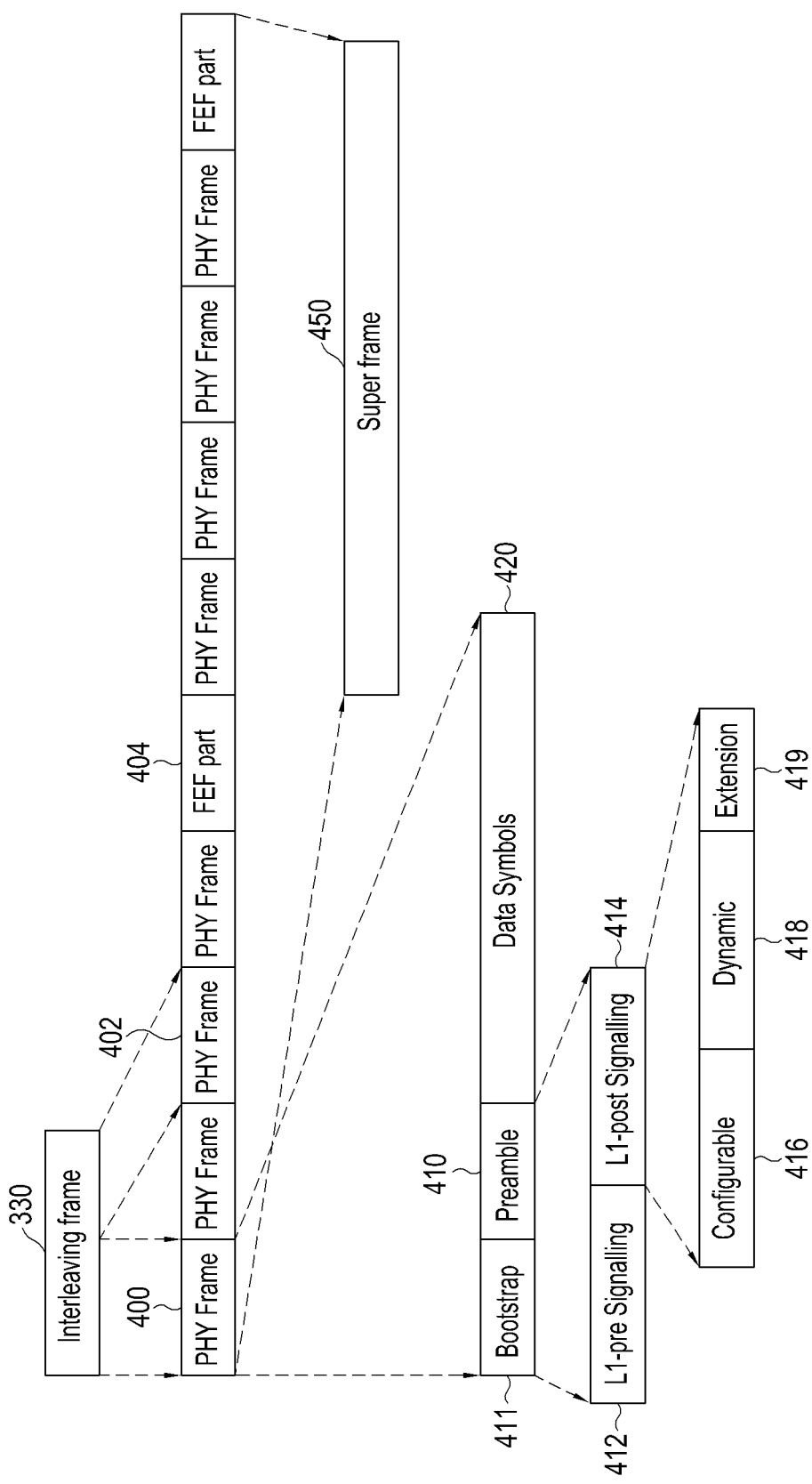

FIGS. 4A and 4B are diagrams illustrating a structure of an L1 frame according to the first embodiment of the present disclosure.

The single interleaving frame 330 may be transmitted through one or more L1 transmission frames. FIG. 4A illustrates a case in which the interleaving frame 330 is transmitted through two different transmission frames 400 and 402. A transmission frame may be transmitted through a physical (PHY) layer. In the examples of FIGS. 4A and 4B, the "transmission frame" is expressed as a "PHY frame" 400 and 402.

A plurality of transmission frames 400 and 402 and a future extension frame (FEF) part 404 may form a single super frame 450.

For example, the single transmission frame 400 may include a preamble symbol 410 and a data symbol 420 that transmits data.

FIG. 4B is a diagram illustrating the structure of an L1 frame when a bootstrap symbol is further included. Optionally, the transmission frame 400 may further include a bootstrap symbol 411 in front of the preamble symbol 410. When various services are temporally multiplexed through a single radio channel, the bootstrap symbol 411 may provide a function of distinguishing the service in a radio frequency (RF) signal level.

The preamble symbol 410 may include an L1-pre signaling area 412 and an L1-post signaling area 414.

The L1-pre signaling area 412 may provide a basic transmission parameter including parameters required for receiving and decoding the L1-post signaling 414, and may have a fixed length.

The L1 post signaling area 414 may include a configurable field 416 and a dynamic field 418. Optionally, the L1 post signaling area 414 may further include an extension field 419. Optionally, the L1 post signaling area 414 may further include a cyclic redundancy check (CRC) field, and may further include an L1 padding field when needed.

The configurable field 416 may include information that may vary based on a super frame unit 450, and the dynamic field 418 may include information that may vary based on a transmission frame unit 400.

The first embodiment of the present disclosure may transmit time information of a system through the dynamic field 418 (the first example of the first embodiment) or the configurable field 416 (the second example of the first embodiment).

According to the first example of the first embodiment in the present disclosure, information structure when a system transmits time information through the dynamic field (that is, an L1 dynamic signaling table) may include a field ("system_time_info_secs" or "system_time_info_franctional_seconds") shown in Table 1 provided below.

TABLE 1

| Syntax | No. of Bits |
|---|---|
| ... | |
| Full_timing_information_indicator | 1 |
| if (Full_timing_information_indicator == 0) | |
| { | |
|     system_time_info_secs | 32 |
| } | |
| else { | |
|     system_time_info_secs | 32 |
|     system_time_info_franctional_seconds | 32 |
| } | |
| ... | |

Full_timing_information_indicator in Table 1 is a system time information length indicator, and when the value is 0, the indicator indicates 32-bit system time information. When the value is 1, the indicator indicates 64-bit system time information.

A system_time_info_secs field and a system_time_info_franctional_seconds field in Table 1 are information indicating a transmission time of the transmission frame 400 that transmits the L1 dynamic signaling table including information of Table 1. Particularly, the system_time_infor_secs field may indicate a system clock time based on a second unit (from 0 to $2^{32}$ seconds (÷136 years)). The system_time_info_franctional_seconds field may indicate a system clock time based on a unit that is less than or equal to a second (from 0 to $2^{32}$ seconds (÷233 pico second)).

When a broadcasting signal of the system is transmitted to a client through an RF broadcasting network, a transmission delay between the system and the client is almost zero. Also, time information of the system included in the dynamic area 418 is information updated for each L1 transmission frame. Therefore, according to the first example of the first embodiment in the present disclosure, when absolute time information of the system is transmitted to the dynamic area 418 of the L1 transmission frame 400 through RF transmission, the client may use the absolute time information and may be synchronized with the absolute time of the system without an error associated with a transmission delay.

According to the second example of the first embodiment in the present disclosure, when the system transmits time information through the configurable field, the L1-pre signaling table of Table 2 may be transmitted through the L1-pre signaling area 412, and the L1 configurable signaling table of Table 3 may be transmitted through the configurable field 416, and the L1 dynamic signaling table of Table 4 may be transmitted through the dynamic field 418.

TABLE 2

| Syntax | No. of Bits |
|---|---|
| ... | |
| FFT_SIZE | 2 |
| GUARD_INTERVAL | 4 |
| NUM_FRAMES | 8 |
| NUM_DATA_SYMBOLS | 10 |
| ... | |

TABLE 3

| Syntax | No. of Bits |
|---|---|
| ... | |
| Full_timing_information_indicator | 1 |
| if (Full_timing_information_indicator == 0) | |
| { | |
|     system_time_info_secs | 32 |
| } | |
| else { | |
|     system_time_info_secs | 32 |
|     system_time_info_franctional_seconds | 32 |
| } | |
| ... | |

TABLE 4

| Syntax | No. of Bits |
|---|---|
| ... | |
| FRAME_INDEX | 8 |
| ... | |

"FFT_SIZE" of Table 2 is a field indicating a fast Fourier transform (FFT) size used for data symbol generation of a current super frame. The current super frame indicates a super frame including a transmission frame through which the information of Table 2 is transmitted.

For example, the detailed value of an FFT size is as shown in Table 5

TABLE 5

| Value | FFT size |
|---|---|
| 00 | 8K |
| 01 | 16K |
| 10 | 32K |
| 11 | Reserved for future use |

"GUARD_INTERVAL" of Table 2 is a field indicating a guard interval used for the current super frame. For example, the detailed value of a guard interval is as shown in Table 6 provided below.

TABLE 6

| Value | Guard Interval |
|---|---|
| 0000 | 3/512 |
| 0001 | 6/512 |
| 0010 | 12/512 |
| 0011 | 24/512 |
| 0100 | 36/512 |
| 0101 | 48/512 |
| 0110 | 57/512 |
| 0111 | 72/512 |
| 1000 | 96/512 |
| 1001~1111 | Reserved for future use |

"NUM_FRAMES" is a field indicating the number of transmission frames that the current super frame includes.

"NUM_DATA_SYMBOLS" of Table 2 is a field indicating the number of orthogonal frequency division multiplexing (OFDM) data symbols included in a single transmission frame, excluding a preamble symbol.

A "system_time_info_secs" field and a "system_time_info_franctional_seconds" field of Table 3 are information indicating a time when a first transmission frame of the current super frame is transmitted. The current super frame is a super frame including a transmission frame through which the L1 configurable signaling table of Table 3 is transmitted.

"FRAME_INDEX" of Table 4 is a field indicating the position of a transmission frame through which the L1 dynamic signaling table of Table 4 is transmitted in the current super frame. The current super frame is a super frame including the transmission frame through which the L1 dynamic signaling table of Table 4 is transmitted.

For example, the value of the "FRAME_INDEX" field of a first transmission frame of each super frame is set to 0, and the value of the "FRAME_INDEX" field of a subsequent transmission frame is increased by 1 for each.

In this instance, a method of calculating a time T_C when the current transmission frame has been transmitted is as given in Equation 1 provided below.

$$T\_C = T\_S + FRAME\_INDEX * T\_F \quad \text{[Equation 1]}$$

T_S in Equation 1 is a transmission time of a first transmission frame included in the current super frame, and may be calculated by the combination of one or more out of the system_time_info_secs field and the system_time_info_fractional_seconds field of Table 3.

T_F in Equation 1 is the duration of the current transmission frame, and may be calculated based on Equation 2 provided below.

$$T\_F = T\_P + T\_Sb * NUM\_DATA\_SYMBOLS \quad \text{[Equation 2]}$$

T_P in Equation 2 is the duration of a preamble, and a previously agreed value may be used. T_Sb in Equation 2 is the duration of an OFDM data symbol, and may be calculated based on the FFT_SIZE field and the GUARD_INTERVAL field of FIG. 2, and a previously agreed OFDM system's elementary period value.

In the above embodiments, it has been described that time information is transmitted through the dynamic field 418 (the first example of the first embodiment) or the configurable field 416 (the second example of the first embodiment) according to a determined scheme.

Depending on embodiments, a signaling field indicating whether the time information is transmitted based on the first example of the first embodiment or the second example of the first embodiment may be added to the L1-pre signaling area 412 or the configurable field 416. Therefore, when the system changes a value (for example, to 0 or 1) of the signaling field added to the L1 pre-signaling area 412 or the configurable field 416, the system may manage the location through which the time information is transmitted variably (as a time elapses).

The first embodiment describes a method of transmitting the time information through the L1-pre signaling area 412 or the configurable field 416 by assuming that an L1 signaling has a hierarchical structure similar to DVB-T2. However, the present disclosure may not be limited to the L1 signaling having a hierarchical structure, and may be applied to an L1 signaling which does not have a hierarchical structure.

Also, although the first embodiment signals time information using system_time_info_secs, or separately signals a time based on a second unit and a time based on a unit that is less than a second using system_time_info_secs and system_time_info_fractional_seconds through separate fields, the method of configuring a signaling field used for reporting the time information in the present disclosure may not be limited to the signaling method of the first embodiment. In the actual implementation, algorithms that compress and integrate the two fields (system_time_info_secs and system_time_info_franctional_seconds) may be additionally applied to increase transmission efficiency. For example, when the transmission period of a PHY frame is limited based on a one-second unit, only a time based on a second unit may be transmitted. When the transmission period is not based on a one-second unit, the time information may be expressed using the transmission period of a PHY frame as a time unit, and thus, the length of a signaling field required to report the time information may be reduced.

Subsequently, the second embodiment of the present disclosure that transmits time information using an L2 signaling will be described.

Figure 5:
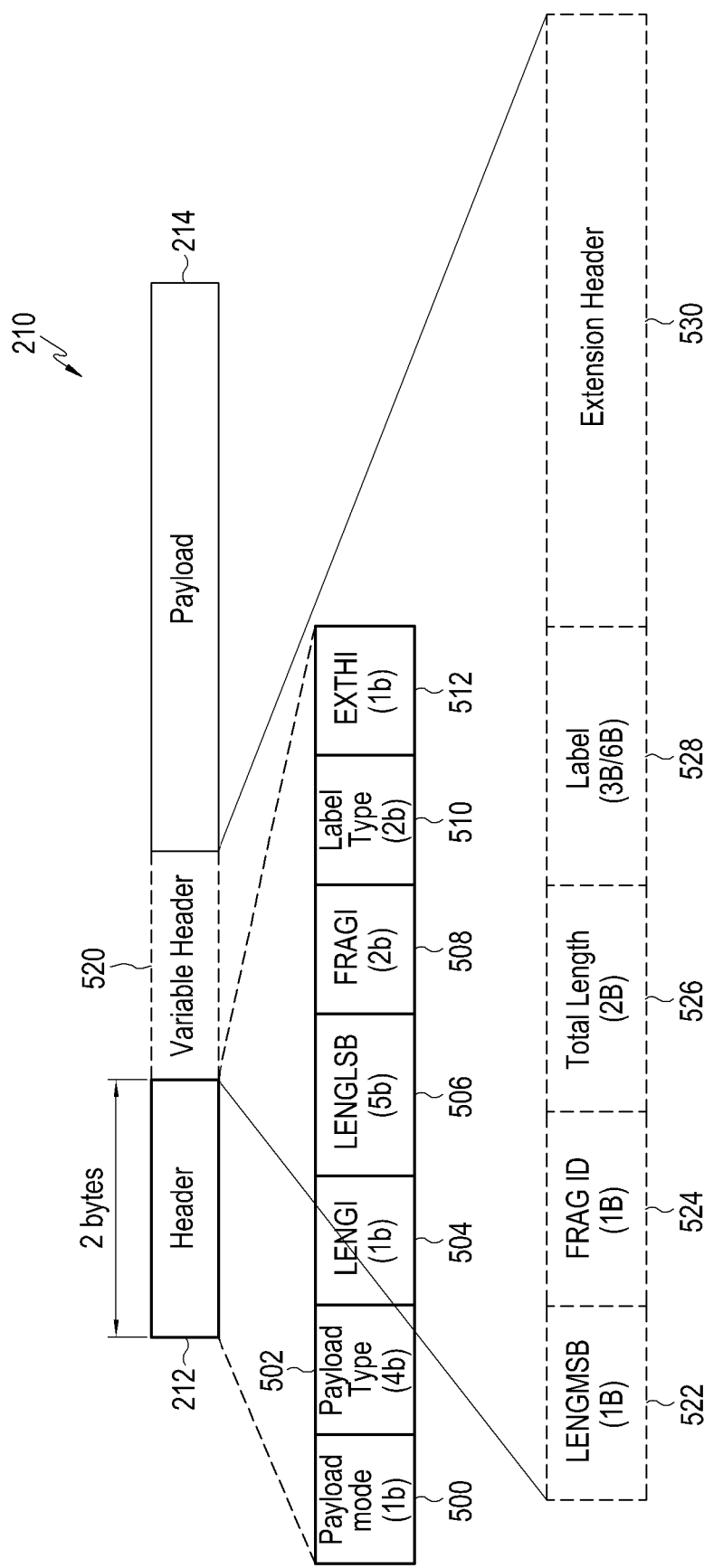
FIG. 5 is a diagram illustrating a structure of an L2 protocol according to a second embodiment of the present disclosure.

FIG. 5 is a diagram illustrating a structure of an L2 protocol according to the second embodiment of the present disclosure.

The BBP 210 included in an L2 protocol may include a header 212 and a payload 214. Optionally, the BBP 210 may further include a variable header 520.

The header 212 may include sub-parts as shown in FIG. 5. Particularly, the header 212 may include "Payload mode" 500, "Payload type" 502, "LENGI" 504, "LENGLSB" 506, "FRAGI" 508, "Label Type" 510, and "EXTHI" 512.

"Payload mode" 500 may include a 1-bit flag indicating whether the BBP 210 is "signaling" or "data".

The "Payload type" 502 may include 4-bit information for indicating a type of payload of the BBP 210. For example, the "Payload type" 502 may indicate whether the type of payload is IPv4 or IPv6, and whether header compression is involved.

The "LENGI" 504 includes a 1-bit flag indicating whether the BBP 210 is a short L2 packet length mode or a long L2 packet length mode.

The "LENGLSB" 506 includes a 5-bit least significant bit (LSB) indicating the length of the BBP 210. When the value of the "LENGI" 504 is 0 (that is, a case of indicating the short L2 packet length mode), the "LENGLSB" 506 may indicate the length of the BBP 210.

The "FRAGI" 508 includes 2-bit information indicating whether a protocol data unit (PDU) is segmented, and indicating whether the BBP 210 is a first segment or not when the segmentation is performed.

The "Label Type" 510 includes 2-bit information indicating whether a label field is included in the variable header 520, and indicating a type of label. The label is a concept corresponding to a package of the MMT standard, and may be information for identifying a service (or TV logical channel). That is, the label may be used as reference information for hardware filtering of a BBP sub-stream. The label may be used for a padding.

The "EXTHI" 512 includes 1-bit information indicating whether an extension header exists in the variable header 520.

The variable header 520 may include sub-parts as shown in FIG. 5. Particularly, the variable header 520 may include "LENGMSB" 522, "FRAG ID" 524, "Total length" 526, "Label" 528, and "Extension Header" 530.

The "LENGLSB" 522 includes a 1-byte most significant bit (MSB) indicating the length of the BBP 210. The "LENGMSB" 522 exists when the value of the "LENGI" 504 is 1 (that is, a case of indicating the long L2 packet length mode).

The "FRAG ID" 524 is 1-byte information existing when the "FRAGI" 508 indicates that PDU segmentation is applied. The "FRAG ID" 524 is ID information for identifying the BBP from a plurality of BBPs corresponding to PDU segments.

The "Total length" 526 is 2-byte information indicating the length of a PDU when the FRAGI 508 indicates that a current BBP is a first segment of the PDU segments. The "Total length" 526 may be used for checking the length of the PDU after reassembly of BBPs.

The "Label" 528 is 3-byte or 6-byte information including the label information.

The "Extension Header" 530 is an N-byte field for predetermined information (e.g., for dedicated signaling).

In the second embodiment of the present disclosure, the system transmits time information through an L2 packet, that is, the payload 214 of the BBP 210. The time information transmitted in the BBP payload 214 may have a structure that is the same as the table of Table 1. In this instance, the "Payload mode" 500 field of the header 212 may be set to a value (e.g., "1") indicating "signaling", and may be transmitted.

Figure 6:
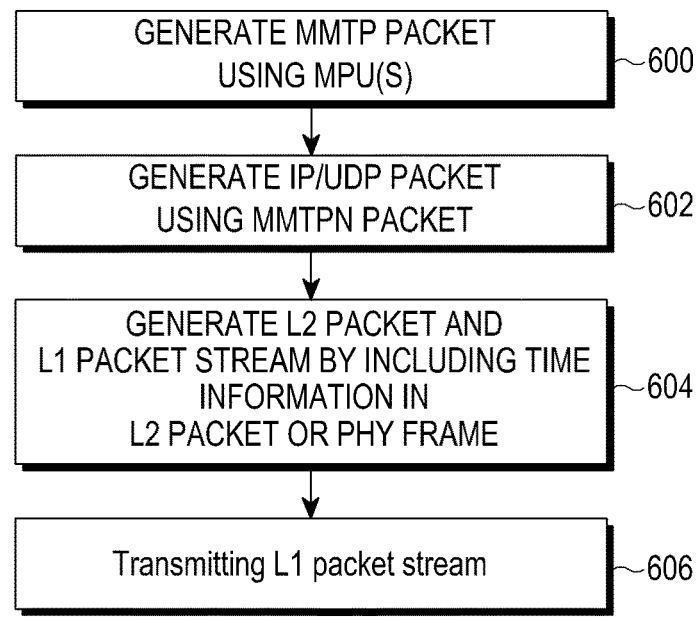
FIG. 6 is a diagram illustrating a data transmission method of a system according to embodiments of the present disclosure.

FIG. 6 is a diagram illustrating a data transmission method of a system according to embodiments of the present disclosure.

The system generates an MMT protocol (MMTP) packet using at least one media processing unit (MPU) associated with a predetermined service (e.g., a TV channel) in operation 600. The MPU is a basic processing unit forming a broadcasting content.

The system generates an IP/UDP packet using the MMTP packet in operation 602.

The system generates an L2 packet (BBP) and an L1 packet stream (BBF) using the IP/UDP packet. In this instance, the system includes absolute time information of the system in a transmission frame (PHY frame) included in a payload of the L2 packet or the L1 packet stream in operation 604.

The system broadcasts the L1 packet stream through an RF channel or a broadband network in operation 606.

Figure 7:
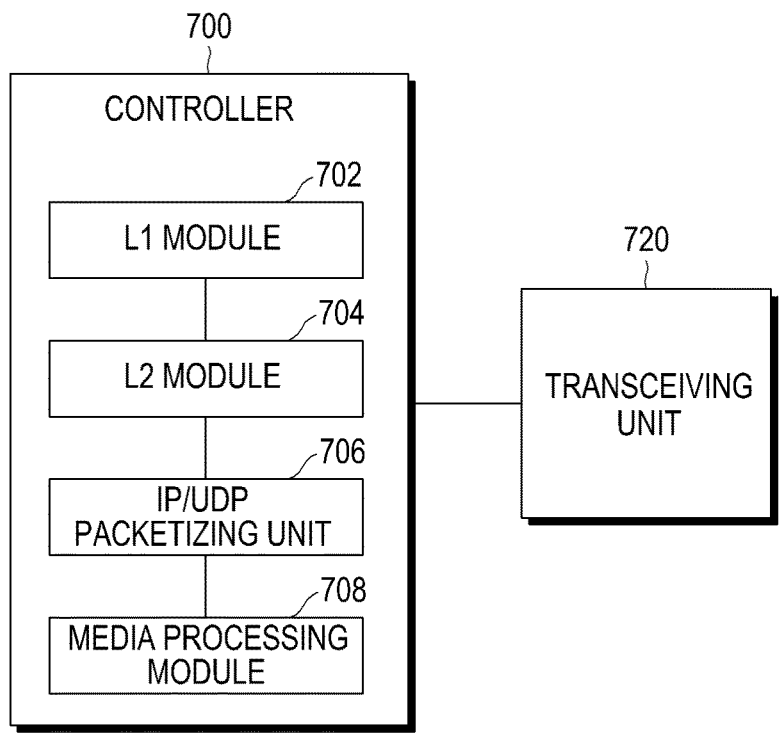
FIG. 7 is a diagram illustrating a configuration of a system device according to embodiments of the present disclosure.

FIG. 7 is a diagram illustrating a configuration of a system device according to embodiments of the present disclosure.

The system device of FIG. 7 is a device that performs operations of a system that has been described in the present disclosure. The system device may perform, for example, the data transmission method of the system, which has been described in FIG. 6.

The system device may include: a transceiving unit 720 that broadcasts various signals to a client; and a controller 700 that controls the transceiving unit 720 and processes the various signals. Although illustrated as a separate module, the transceiving unit 720 and the controller 700 may be embodied as a single device.

It may be understood that the controller 700 performs all of the operations of the system that have been described in the present disclosure.

For example, the controller 700 may include various detailed modules 702 to 708 as follows, but the detailed modules may be embodied as a single module like the controller 700.

A media processing module 708 may generate an MPU using content data corresponding to a predetermined service (e.g., a TV channel), and may generate an MMTP packet using the MPU. Optionally, an MMT signal may be used for generating the MMTP packet. For example, MMT-CI may be included in the MMT signal.

The IP/UDP packetizing unit 706 may generate an IP/UDP packet using the MMTP packet.

The L2 module 704 may generate an L2 packet such as a baseband packet (BBP) using the IP/UDP packet.

The L1 module 702 may encode an L1 packet sub-stream using the L2 packet, and may generate a data pipe (e.g., PLP).

The transceiving unit 720 broadcasts the generated data pipe through an RF channel or a broadband network.

Figure 8:
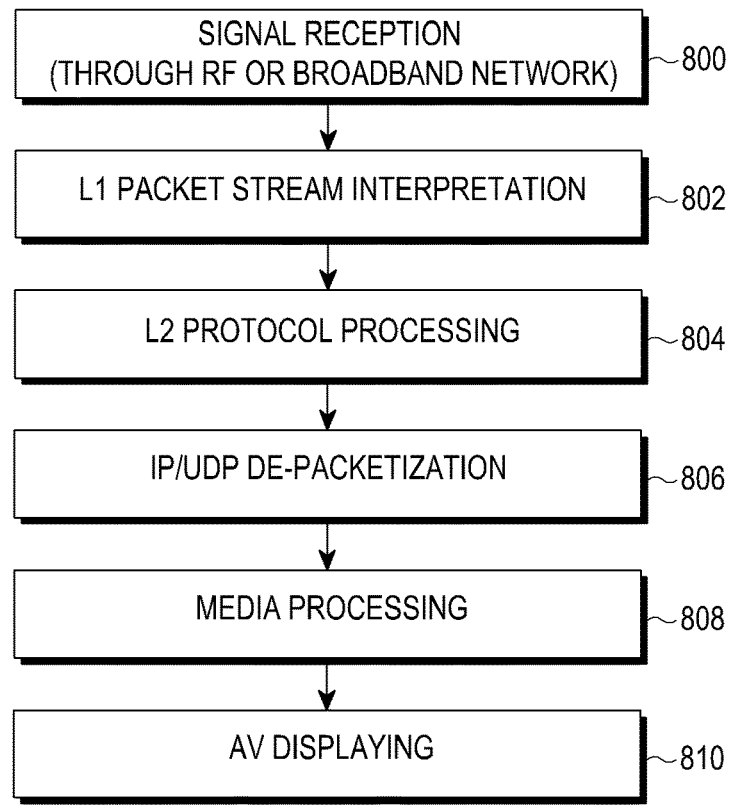
FIG. 8 is a diagram illustrating a data receiving method of a client according to embodiments of the present disclosure.

FIG. 8 is a diagram illustrating a data receiving method of a client according to embodiments of the present disclosure.

The client receives a signal broadcasted from a system in operation 800. The signal may be received through an RF channel or a broadband network.

The client restores a packet stream by interpreting an L1 layer of the received signal. Optionally, the client obtains time information that is transmitted through an L1 transmission frame through which the restored packet stream is transmitted, and performs synchronization by setting the time information as a current time. A signaling table (Table 1 or Table 3) including the time information may be transmitted through a dynamic field or a configurable field of the L1 transmission frame.

The client processes the L1 packet stream to be restored to the L2 packet in operation 804. Optionally, the client obtains time information that is transmitted through a payload of the restored L2 packet, and performs synchronization through which the time information is set as a current time.

The client obtains an IP/UDP packet by de-packetizing the L2 packet in operation 806.

The client extracts media content data (e.g., MPU) by processing the IP/UDP packet in operation 808. In the process of extracting the media content data, the set current time may be used.

The client performs audio video (AV) display that reproduces the media content data in operation 810. In the AV display process, the set current time may be used as a reference time for determining a point in time when to reproduce the content data.

Figure 9:
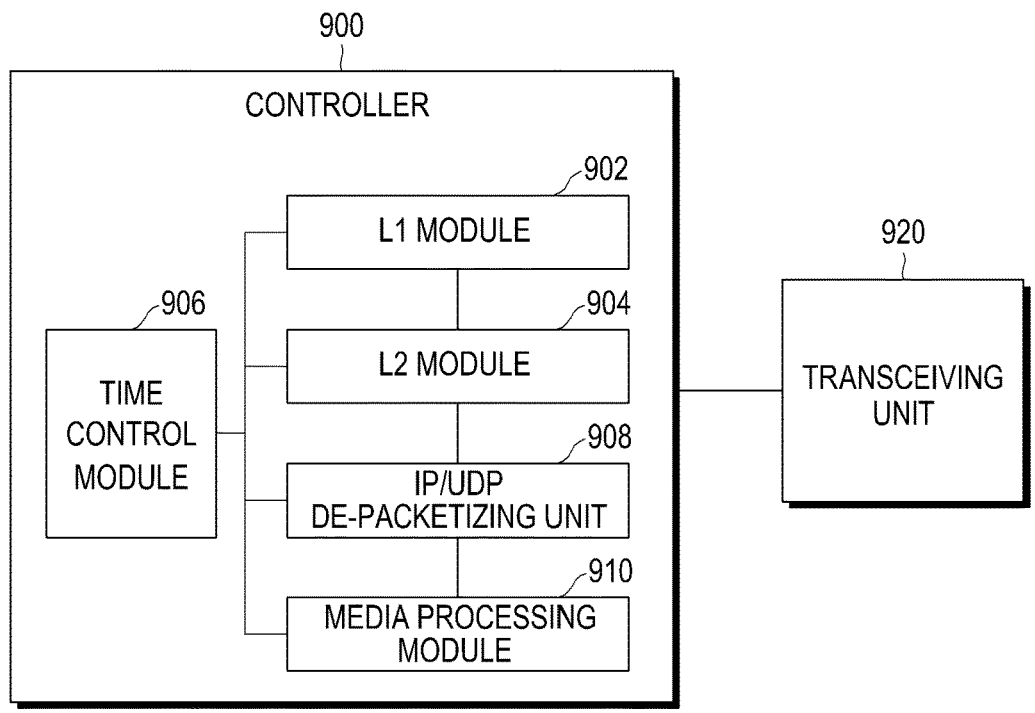
FIG. 9 is a diagram illustrating a configuration of a client device according to embodiments of the present disclosure.

FIG. 9 is a diagram illustrating a configuration of a client device according to embodiments of the present disclosure.

The client device of FIG. 9 is a device that performs operations of a client that has been described in the present disclosure. The client device may perform, for example, the data transmission method of the client, which has been described in FIG. 8.

The client device may include: a transceiving unit 920 that receives various signals from a system; and a controller 900 that controls the transceiving unit 920 and processes the various signals. Although illustrated as a separate module, it is natural that the transceiving unit 920 and the controller 900 may be embodied as a single device.

It may be understood that the controller 900 performs all of the operations of the client that have been described in the present disclosure.

For example, the controller 900 may include various detailed modules 902 to 910 as follows, but the detailed modules may be embodied a single module like the controller 900.

The transceiving unit 920 receives a signal broadcasted from the system. The broadcasting signal may be received through an RF channel or a broadband network.

An L1 module 902 restores a packet stream by interpreting an L1 layer of the received signal.

An L2 module 904 restores an L2 packet by processing the L1 packet stream.

A time control module 906 obtains time information transmitted through the L2 packet or the L1 transmission frame in the restored packet stream, and may perform synchronization by setting the time information as a current time.

The IP/UDP de-packetizing unit 908 obtains an IP/UDP packet by de-packetizing the L2 packet.

A media processing module 910 extracts media content data (e.g., MPU) by processing the IP/UDP packet. The media processing module 910 uses the set current time in the process of extracting the media content data.

The client device may further include an AV display unit for displaying AV using the media content data. An AV display unit may use the set current time in the AV displaying process.

Figure 10:
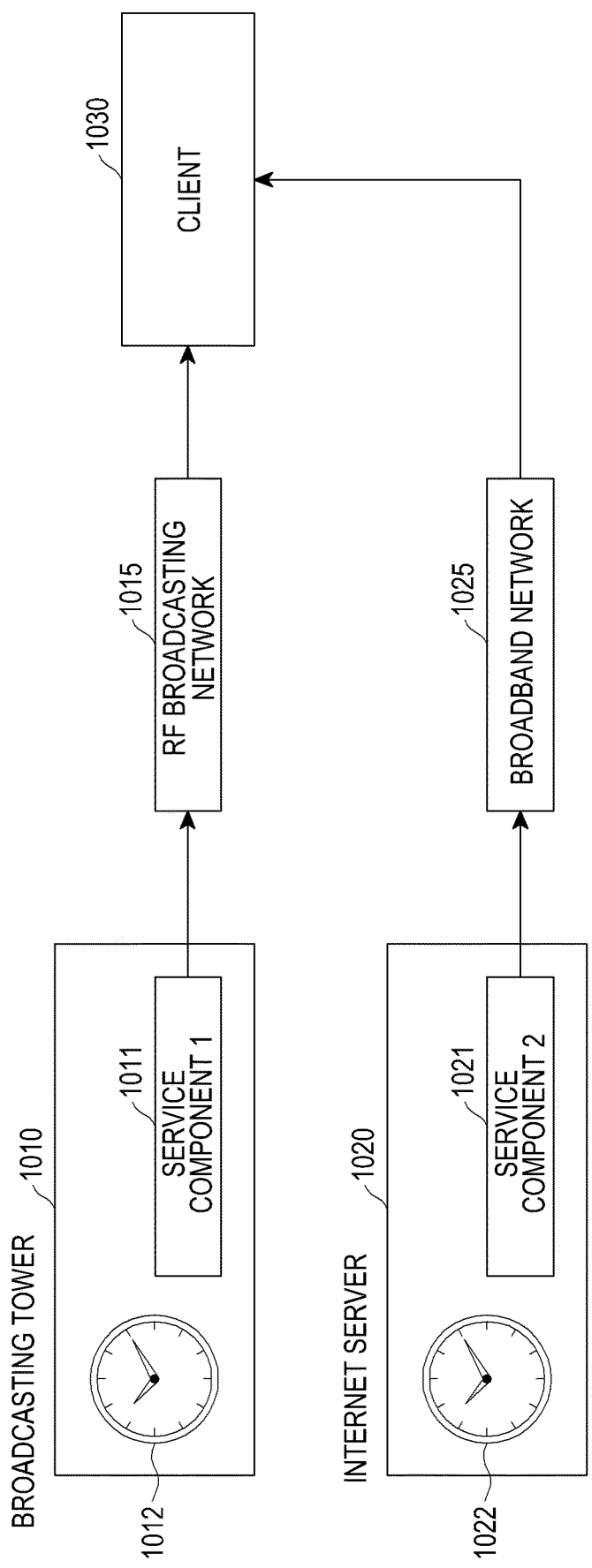
FIG. 10 is a diagram illustrating a method that a client uses for the synchronization of heterogeneous network contents according to embodiments of the present disclosure.

FIG. 10 is a diagram illustrating a method that a client uses for the synchronization of heterogeneous network contents.

Referring to FIG. 10, a single service is broadcasted from a broadcasting tower 1010 and an Internet server 1020. The broadcasting tower 1010 is a system that provides broadcasting through an RF network, and the Internet server 1020 is a system that provides broadcasting through a broadband network. The service may include two service components 1011 and 1021. For example, a service component 1 1011 may be an audio component of the service, and a service component 2 1021 may be a video component of the service.

The broadcasting tower 1010 transfers the service component 1 1011 to a client 1030 using an RF broadcasting network 1015, and the Internet server 1020 transfers the service component 2 1021 to the client 1030 through a broadband network 1025.

In this instance, the transmission time and the reproduction time of the service component 1 1011 and the service component 2 1021 are respectively expressed based on a system time 1012 of the broadcasting tower 1010 and a system time 1022 of the Internet server 1020. The system time 1012 of the broadcasting tower 1010 and the system time 1022 of the Internet server 1020 may be set to comply with the certified time standard. The certified time standard may include, for example, universal time coordinated (UTC) or Greenwich mean time (GMT).

According to embodiments of the present disclosure, the current time of the client 1030 may be synchronized with the system time 1012 of the broadcasting tower 1010 through an L1 signaling (or L2 signaling). Accordingly, the the current time of the client 1030 may also be synchronized with the system time 1022 of the Internet server 1020.

Therefore, the client 1030 may reproduce a media content at a planed point in time, irrespective of a type of network that transmits the media content. Consequentially, all clients can reproduce the media content at a point in time that is synchronized with a system time.

Figure 11:
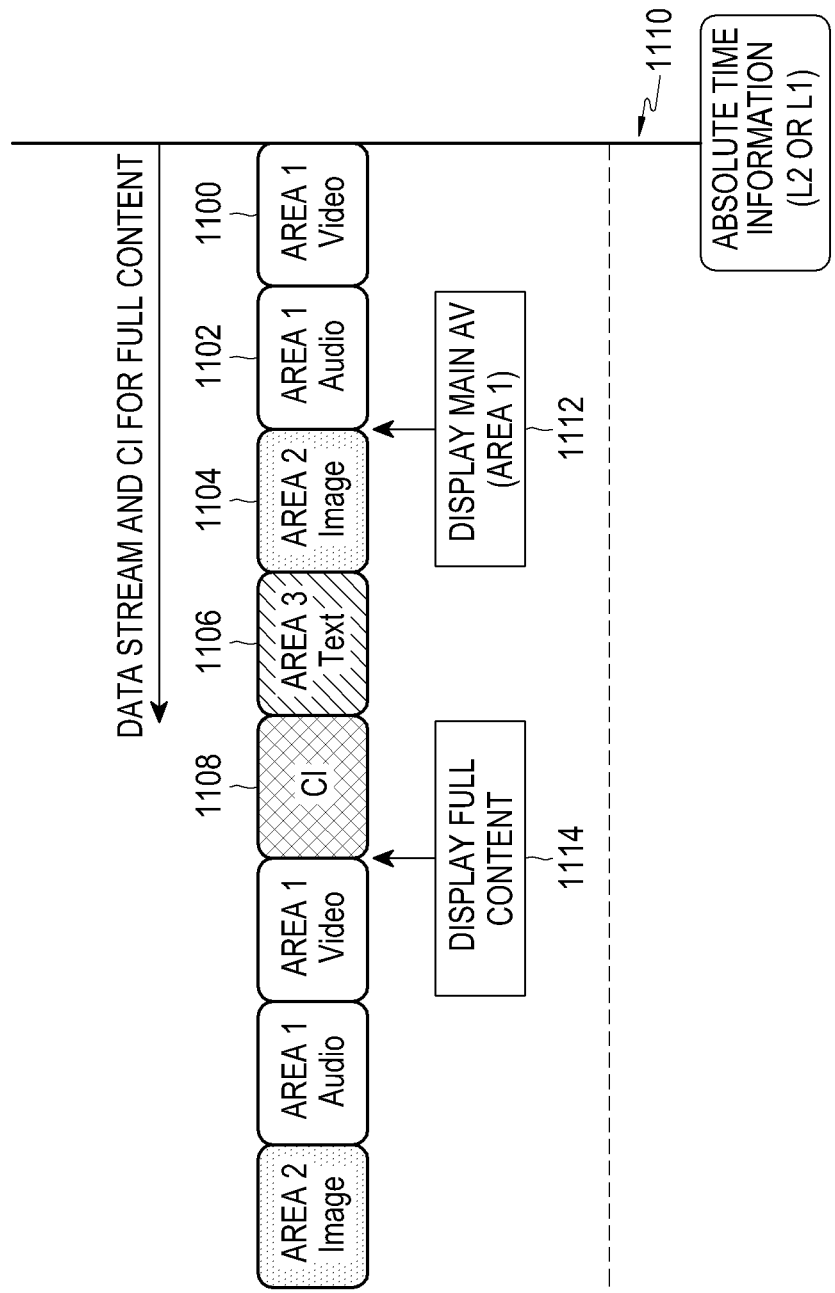
FIG. 11 is a diagram illustrating a mechanism that synchronizes a plurality of service components received from a heterogeneous network, and plays back the same according to embodiments of the present disclosure.

FIG. 11 is a diagram illustrating a mechanism that synchronizes a plurality of service components received from a heterogeneous network, and plays back the same.

A plurality of service components 1100, 1102, 1104, and 1106 and CI information 1108, which form a single content, may be received by a client from a heterogeneous network. The CI information is information required to reproduce the service components, and includes at least one of a location in a screen and a reproduction start time for each service component. Also, it is assumed that information associated with a reproduction start time of a main AV is transferred through a separate method. The client may obtain the current time of a system in advance (e.g., a point 1110) through an L1 or L2 signaling.

When the time information of the present disclosure is used, the main AV may be displayed at a point 1112 when a video service component 1100 of an area 1 (Area 1) that forms the main AV and an audio service component 1102 of the area 1 are completely received. Also, an image 1104 of an area 2 and text 1106 of an area 3 may be output at a point 1114 when all service components and CI forming the content are completely received.

When the time information of the present disclosure is not used, a reference time used for setting the reproduction times of the service components may be different from the start of the system, and thus, a reproduction start time of each area may be changed and a screen of a user may be changed to be different from the intention of a service provider.

The above described embodiments assume that a receiver receives absolute time reported by a transmitter, without a processing time, and sets a receiver time. However, in the actual implementation, a processing time in which the receiver performs demodulation after receiving an RF signal, interprets a signaling field indicating time information, and sets a receiver time, may be meaningful.

Therefore, the receiver may correct and use the received time information. For example, the transmitter may set the value of the signaling field as a transmission time of the transmission frame. Particularly, the transmitter may set the values of signaling fields (system_time_info_secs and system_time_info_franctional_seconds) indicating the time information as a value indicating a time when a PHY frame including the signaling field starts to be transmitted from a transmission antenna.

Actually, the distance from the transmission antenna that transmits an RF signal to a reception antenna that receives the RF signal is generally very short when compared to a propagation velocity of the RF signal, and may be negligible. Therefore, it may be assumed that the point in time when the receiver starts receiving the RF signal is equal to the point in time when the RF signal starts to be transmitted. The receiver may record a reception start point TA of the RF signal using its local clock. Also, the receiver may also record a point TB when time information is obtained from a first PHY frame included in the RF signal, using the local clock of the reception system. Therefore, the receiver converts the difference between the obtained TB and TA based on an absolute time unit, and corrects the converted difference in time regarding obtained time information (that is, absolute time information), thereby synchronizing its time with the transmitter.

It should be construed that the diagram of the structure of the L1 and L2 transmission protocol, the diagram of a system transmission method, the diagram of the configuration of a system device, the diagram of a client's reception method, the diagram of the configuration of a client device, the diagram of a heterogeneous network content synchronization method, and the like illustrated in FIGS. 1 to 11 are not intended to limit the scope of right of the present disclosure. That is, all protocol stacks, configurations, or steps of the operations illustrated in FIGS. 1 to 11 should not be interpreted as essentially structural elements for carrying out the present disclosure, and variations and modifications of the present disclosure may be implemented without departing from the scope of the present disclosure.

The operations described in advance may be implemented by including a memory device storing a corresponding program code in a system of a communication system or a configuration in a client device. That is, the controller of the system or the client device may perform the above described operations by reading and executing the program code stored in the memory device by means of a processor or a central processing unit (CPU).

Various configuration units and modules of the system or client device described in the present specification may be operated by using a hardware circuit, e.g., a complementary metal oxide semiconductor based logic circuit, firmware, software, and/or a combination of hardware and the firmware and/or software embedded in a machine readable medium. As an example, various electric configurations and methods may be carried out by using electric circuits such as transistors, logic gates, and an application specific integrated circuit (ASIC).

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An apparatus for transmitting data in an internet protocol (IP)-based broadcasting network, the apparatus comprising:
   a transceiver; and
   at least one processor coupled to the transceiver,
   wherein the at least one processor is configured to:
      identify information indicating a transmission time of a frame and a field related to timing information of the frame, wherein the field related to timing information of the frame includes information indicating a unit of a fractional second associated with the transmission time of the frame according to a value of the field, and
      transmit the frame including the information indicating the transmission time of the frame and the field related to the timing information of the frame.

2. The apparatus of claim 1, wherein the information indicating the transmission time of the frame and the field related to the timing information of the frame are included in a preamble of the frame.

3. A method for receiving data in an internet protocol (IP)-based broadcasting network, the method comprising:
   receiving a frame including information indicating a transmission time of the frame and a field related to timing information of the frame,
   wherein the field related to timing information of the frame includes information indicating a unit of a fractional second associated with the transmission time of the frame according to a value of the field.

4. The method of claim 3, wherein the information indicating the transmission time of the frame and the field related to the timing information of the frame are included in a preamble of the frame.

5. An apparatus for receiving data in an internet protocol (IP)-based broadcasting network, the apparatus comprising:
   a transceiver; and
   at least one processor coupled to the transceiver,
   wherein the at least one processor is configured to receive a frame including information indicating a transmission time of the frame and a field related to timing information of the frame, and
   wherein the field related to timing information of the frame includes information indicating a unit of a fractional second associated with the transmission time of the frame according to a value of the field.

6. The apparatus of claim 5, wherein the information indicating the transmission time of the frame and the field related to the timing information of the frame are included in a preamble of the frame.

* * * * *